US006758035B2

(12) United States Patent
Smaling (10) Patent No.: US 6,758,035 B2
(45) Date of Patent: Jul. 6, 2004

(54) METHOD AND APPARATUS FOR PURGING $SO_X$ FROM A $NO_X$ TRAP

(75) Inventor: Rudolf M. Smaling, Bedford, MA (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/245,884

(22) Filed: Sep. 18, 2002

(65) Prior Publication Data

US 2004/0050035 A1 Mar. 18, 2004

(51) Int. Cl.[7] .................................................. F01N 3/00
(52) U.S. Cl. .......................... 60/285; 60/274; 60/286; 60/295; 60/297; 422/177; 422/182; 422/186.11
(58) Field of Search ....................... 60/274, 275, 281, 60/286, 292, 295, 297, 300, 303, 285; 422/172, 177, 182, 185, 186.11

(56) References Cited

U.S. PATENT DOCUMENTS

| | | |
|---|---|---|
| 2,787,730 A | 4/1957 | Berghaus et al. |
| 3,018,409 A | 1/1962 | Berghaus et al. |
| 3,035,205 A | 5/1962 | Berghaus et al. |
| 3,423,562 A | 1/1969 | Jones et al. |
| 3,594,609 A | 7/1971 | Vas |
| 3,622,493 A | 11/1971 | Crusco |
| 3,649,195 A | 3/1972 | Cook et al. |
| 3,755,131 A | 8/1973 | Shalit |
| 3,779,182 A | 12/1973 | Camacho |
| 3,841,239 A | 10/1974 | Nakamura et al. |
| 3,879,680 A | 4/1975 | Naismith et al. |
| 3,894,605 A | 7/1975 | Salvadorini |
| 3,982,962 A | 9/1976 | Bloomfield |
| 3,992,277 A | 11/1976 | Trieschmann et al. |
| 4,033,133 A | 7/1977 | Houseman et al. |
| 4,036,131 A | 7/1977 | Elmore |
| 4,036,181 A | 7/1977 | Matovich |
| 4,059,416 A | 11/1977 | Matovich |
| 4,099,489 A | 7/1978 | Bradley |
| 4,144,444 A | 3/1979 | Dementiev et al. |
| 4,168,296 A | 9/1979 | Lundquist |
| 4,339,546 A | 7/1982 | Randalls |
| 4,436,793 A | 3/1984 | Adlhart |
| 4,458,634 A | 7/1984 | Carr et al. |
| 4,469,932 A | 9/1984 | Spiegelberg et al. |
| 4,473,622 A | 9/1984 | Chludzinski et al. |
| 4,522,894 A | 6/1985 | Hwang et al. |

(List continued on next page.)

FOREIGN PATENT DOCUMENTS

| | | |
|---|---|---|
| DE | 237120 A1 | 6/1924 |
| DE | 30 48 540 | 7/1982 |
| DE | DD 237120 A1 | 7/1986 |

(List continued on next page.)

OTHER PUBLICATIONS

Jahn, "Physics of Electric Propulsion", pp. 126–130 (1968).
Belogub et al., "Petrol–Hydrogen Truck With Load–Carrying Capacity 5 Tons", Int. J. Hydrogen Energy, vol. 16, No. 6, pp. 423–426 (1991).

(List continued on next page.)

Primary Examiner—Binh Tran
(74) Attorney, Agent, or Firm—Barnes & Thornburg LLP (57) ABSTRACT

A method of operating a fuel reformer to regenerate a $NO_X$ trap includes operating the fuel reformer to produce a reformate gas comprising hydrogen and carbon monoxide and advancing reformate gas through the $NO_X$ trap so as to regenerate the $NO_X$ trap. The method further includes determining if a $SO_X$ regeneration of the $NO_X$ trap is to be performed and generating a $SO_X$-regeneration control signal in response thereto. The temperature of the $NO_X$ trap is raised and reformate gas is advanced into the $NO_X$ trap in response to the $SO_X$-regeneration signal so as to remove $SO_X$ from within the $NO_X$ trap. A fuel reformer system is also disclosed.

11 Claims, 4 Drawing Sheets

U.S. PATENT DOCUMENTS

| | | | |
|---|---|---|---|
| 4,578,955 A | | 4/1986 | Medina |
| 4,625,511 A | | 12/1986 | Scheitlin et al. |
| 4,625,681 A | | 12/1986 | Sutekiyo |
| 4,645,521 A | | 2/1987 | Freesh |
| 4,651,524 A | | 3/1987 | Brighton |
| 4,657,829 A | | 4/1987 | McElroy et al. |
| 4,830,492 A | | 5/1989 | Ko |
| 4,841,925 A | | 6/1989 | Ward |
| 4,928,227 A | | 5/1990 | Burba et al. |
| 4,963,792 A | | 10/1990 | Parker |
| 4,967,118 A | | 10/1990 | Urataki et al. |
| 5,095,247 A | | 3/1992 | Hanamura |
| 5,138,959 A | | 8/1992 | Kulkarni |
| 5,143,025 A | | 9/1992 | Munday |
| 5,159,900 A | | 11/1992 | Dammann |
| 5,205,912 A | | 4/1993 | Murphy |
| 5,207,185 A | | 5/1993 | Greiner et al. |
| 5,212,431 A | | 5/1993 | Origuchi et al. |
| 5,228,529 A | | 7/1993 | Rosner |
| 5,272,871 A | | 12/1993 | Oshima et al. |
| 5,284,503 A | | 2/1994 | Bitler et al. |
| 5,293,743 A | | 3/1994 | Usleman et al. |
| 5,317,996 A | | 6/1994 | Lansing |
| 5,362,939 A | | 11/1994 | Hanus et al. |
| 5,409,784 A | | 4/1995 | Bromberg et al. |
| 5,409,785 A | | 4/1995 | Nakano et al. |
| 5,412,946 A | | 5/1995 | Oshima et al. |
| 5,425,332 A | | 6/1995 | Rabinovich et al. |
| 5,437,250 A | | 8/1995 | Rabinovich et al. |
| 5,441,401 A | | 8/1995 | Yamaguro et al. |
| 5,445,841 A | | 8/1995 | Arendt et al. |
| 5,451,740 A | | 9/1995 | Hanus et al. |
| 5,560,890 A | | 10/1996 | Berman et al. |
| 5,586,433 A | * | 12/1996 | Boegner et al. ............... 60/274 |
| 5,599,758 A | | 2/1997 | Guth et al. |
| 5,660,602 A | | 8/1997 | Collier, Jr. et al. |
| 5,666,923 A | | 9/1997 | Collier, Jr. et al. |
| 5,787,864 A | | 8/1998 | Collier, Jr. et al. |
| 5,813,222 A | | 9/1998 | Appleby |
| 5,826,548 A | | 10/1998 | Richardson, Jr. |
| 5,832,722 A | * | 11/1998 | Cullen et al. .................. 60/274 |
| 5,845,485 A | | 12/1998 | Murphy et al. |
| 5,847,353 A | | 12/1998 | Titus et al. |
| 5,887,554 A | | 3/1999 | Cohn et al. |
| 5,894,725 A | | 4/1999 | Cullen et al. |
| 5,910,097 A | | 6/1999 | Boegner et al. |
| 5,921,076 A | | 7/1999 | Krutzsch et al. |
| 5,974,791 A | | 11/1999 | Hirota et al. |
| 6,012,326 A | | 1/2000 | Raybone et al. |
| 6,014,593 A | | 1/2000 | Grufman |
| 6,038,854 A | * | 3/2000 | Penetrante et al. ........... 60/297 |
| 6,047,543 A | | 4/2000 | Caren et al. |
| 6,048,500 A | | 4/2000 | Caren et al. |
| 6,082,102 A | | 7/2000 | Wissler et al. |
| 6,122,909 A | | 9/2000 | Murphy et al. |
| 6,125,629 A | | 10/2000 | Patchett |
| 6,130,260 A | | 10/2000 | Hall et al. |
| 6,134,882 A | | 10/2000 | Huynh et al. |
| 6,152,118 A | | 11/2000 | Sasaki et al. |
| 6,170,259 B1 | * | 1/2001 | Boegner et al. ............... 60/286 |
| 6,176,078 B1 | | 1/2001 | Balko et al. |
| 6,199,372 B1 | * | 3/2001 | Wakamoto ................... 60/274 |
| 6,235,254 B1 | | 5/2001 | Murphy et al. |
| 6,248,684 B1 | | 6/2001 | Yavuz et al. |
| 6,284,157 B1 | | 9/2001 | Eliasson et al. |
| 6,311,232 B1 | | 10/2001 | Cagle et al. |
| 6,322,757 B1 | | 11/2001 | Cohn et al. |
| 6,363,716 B1 | * | 4/2002 | Balko et al. .................. 60/286 |
| 6,560,958 B1 | * | 5/2003 | Bromberg et al. ............ 60/275 |
| 2002/0012618 A1 | | 1/2002 | Bromberg et al. |
| 2002/0194835 A1 | | 12/2002 | Bromberg et al. |

FOREIGN PATENT DOCUMENTS

| | | |
|---|---|---|
| DE | 195 10 804 | 9/1996 |
| DE | 19644864 A1 | 5/1998 |
| DE | 19644864 | 5/1998 |
| DE | 197 57 936 | 7/1999 |
| DE | 19927518 | 1/2001 |
| EP | 0096538 | 12/1983 |
| EP | 0153116 | 8/1985 |
| EP | 0485922 A1 | 5/1992 |
| EP | 1030395 | 8/2000 |
| EP | 1057998 | 12/2000 |
| FR | 2593493 | 7/1987 |
| FR | 2620436 | 3/1989 |
| GB | 355210 | 2/1930 |
| GB | 1221317 | 2/1971 |
| GB | 2241746 | 11/1991 |
| JP | 51 27630 | 3/1976 |
| JP | 51 27630 | 8/1976 |
| JP | 02 121300 | 5/1990 |
| JP | 03195305 | 8/1991 |
| JP | 05 231242 | 9/1993 |
| JP | 07 292372 | 11/1995 |
| SU | 1519762 | 11/1989 |
| WO | WO 85/00159 | 1/1985 |
| WO | WO 94/03263 | 2/1994 |
| WO | WO 95/06194 | 3/1995 |
| WO | WO 96/24441 | 8/1996 |
| WO | WO 98/45582 | 10/1998 |
| WO | WO 00/26518 | 5/2000 |
| WO | WO 01/14698 A1 | 3/2001 |
| WO | WO 01/14702 A1 | 3/2001 |
| WO | WO 01/33056 A1 | 5/2001 |

OTHER PUBLICATIONS

Breshears et al., "Partial Hydrogen Injection Into Internal Combustion Engines", Proceedings of the EPA $1^{st}$ Symposium on Low Pollution Power Systems and Development, Ann Arbor, MI, pp. 268–277 (Oct. 1973).

Chuveliov et al., "Comparison of Alternative Energy Technologies Utilizing Fossil Fuels and Hydrogen Based on their Damage to Population and Environment in the USSR and East Europe", pp. 269–300.

Correa, "Lean Premixed Combustion for Gas–Turbines: Review and Required Research", PD–vol. 33, Fossile Fuel Combustion, ASME, pp. 1–9 (1991).

Czernichowski et al., "Multi–Electrodes High Pressure Gliding Discharge Reactor and its Applications for Some Waste Gas and Vapor Incineration", Proceedings of Workshop on Plasma Destruction of Wastes, France, pp. 1–13 (1990).

Das, "Exhaust Emission Characterization of Hydrogen–Operated Engine System: Nature of Pollutants and their Control Techniques", Int. J. Hydrogen Energy, vol. 16, No. 11, pp. 765–775 (1991).

Das, "Hydrogen Engines: A View of the Past and a Look into the Future", Int. J. of Hydrogen Energy, vol. 15, No. 6, pp. 425–443 (1990).

Das, "Fuel Induction Techniques for a Hydrogen Operated Engine", Int. J. of Hydrogen Energy, vol. 15, No. 11 (1990).

DeLuchi, "Hydrogen Vehicles: An Evaluation of Fuel Storage, Performance, Safety, Environmental Implants and Costs", Int. J. Hydrogen Energy, vol. 14, No. 2, pp. 81–130 (1989).

Duclos et al., "Diagnostic Studies of a Pinch Plasma Accelerator", AIAA Journal, vol. 1, No. 11, pp. 2505–2513 (Nov. 1963).

Feucht et al., "Hydrogen Drive for Road Vehicles—Results from the Fleet Test Run in Berlin", Int. J. Hydrogen Energy, vol. 13, No. 4, pp. 243–250 (1988).

Finegold et al., "Dissociated Methanol as a Consumable Hydride for Automobiles and Gas Turbines", pp. 1359–1369, Advances in Hydrogen Energy 3 (Jun. 13–17, 1982).

Hall et al., "Initial Studies of a New Type of Ignitor: The Railplug"—SAE Paper 912319, pp. 1730–1746 (1991).

Houseman et al., "Hydrogen Engines Based On Liquid Fuels, A Review", G.E., Proc. $3^{rd}$ World Hydrogen Energy Conf., pp. 949–968 (1980).

Houseman, et al., "Two Stage Combustion for Low Emissions Without Catalytic Converters", Proc. of Automobile Engineering Meeting, Dearborn, MI, pp. 1–9 (Oct. 18–22, 1976).

Jones, et al., "Exhaust Gas Reforming of Hydrocarbon Fuels", Soc. of Automotive Engineers, Paper 931086, pp. 223–234 (1993).

Kaske et al., "Hydrogen Production by the Hüls Plasma–Reforming Process", Proc. VI World Hydrogen Energy Conference, vol. 1, pp. 185–190 (1986).

MacDonald, "Evaluation of Hydrogen–Supplemented Fuel Concept with an Experimental Multi–Cylinder Engine", Society of Automotive Engineers, Paper 760101, pp. 1–16 (1976).

Mackay, "Development of a 24 kW Gas Turbine–Driven Generator Set for Hybrid Vehicles", 940510, pp. 99–105, NoMac Energy Systems, Inc.

Mackay, "Hybrid Vehicle Gas Turbines", 930044, pp. 35–41, NoMac Energy Systems, Inc.

Matthews et al., "Further Analysis of Railplugs as a New Type of Ignitor", SAE Paper 922167, pp. 1851–1862 (1992).

Mishchenko et al., "Hydrogen as a Fuel for Road Vehicles", Proc. VII World Hydrogen Energy Conference, vol. 3, pp. 2037–2056 (1988).

Monroe et al., "Evaluation of a Cu/Zeolite Catalyst to Remove $NO_x$ from Lean Exhaust", Society of Automotive Engineers, Paper 930737, pp. 195–203 (1993).

Rabinovich et al., "On Board Plasmatron Generation of Hydrogen Rich Gas for Engine Pollution Reduction", Proceedings of NIST Workshop on Advanced Components for Electric and Hybrid Electric Vehicles, Gaithersburg, MD, pp. 83–88 (Oct. 1993) (not published).

Rabinovich et al., "Plasmatron Internal Combustion Engine System for Vehicle Pollution Reduction," Int. J. of Vehicle Design, vol. 15, Nos. 3/4/5, pp. 234–242 (1994).

Scott et al., "Hydrogen Fuel Breakthrough with On–Demand Gas Generator", 372 Automotive Engineering, vol. 93, No. 8, Warrendale, PA, U.S.A., pp. 81–84 (Aug. 1985).

Shabalina et al., "Slag Cleaning by Use of Plasma Heating", pp. 1–7.

Handbook of Thermodynamic High Temperature Process Data, pp. 507–547.

Varde et al., "Reduction of Soot in Diesel Combustion with Hydrogen and Different H/C Gaseous Fuels", Hydrogen Energy Progress V, pp. 1631–1639.

Wang et al., "Emission Control Cost Effectiveness of Alternative–Fuel Vehicles", Society of Automotive Engineers, Paper 931786, pp. 91–122 (1993).

Wilson, "Turbine Cars", Technology Review, pp. 50–56 (Feb./Mar., 1995).

Tachtler, "Fuel Cell Auxiliary Power Unit—Innovation for the Electric Supply of Passenger Cars?", Society of Automotive Engineers, Paper No. 2000–01–0374, pp. 109–117 (2000).

Kirwan, "Fast Start–Up On–Board Gasoline Reformer for Near Zero Emissions in Spark–Ignition Engines", Society of Automotive Engineers World Congress, Detroit, MI (Mar. 4–7, 2002), Paper No. 2002–01–1011.

Bromberg, "Emissions Reductions Using Hydrogen from Plasmatron Fuel Converters", Int. J. of Hydrogen Energy 26, pp. 1115–1121 (2001).

Bromberg, "Experimental Evaluation of SI Engine Operation Supplemented by Hydrogen Rich Gas from a Compact Plasma Boosted Reformer", Massachusetts Institute of Technology Plasma Science and Fusion Center Report, JA–99–32 (1999).

Bromberg, "Compact Plasmatron–Boosted Hydrogen Generation Technology for Vehicular Applications", Int. J. of Hydrogen Energy 24, pp. 341–350 (1999).

Gore, "Hydrogen A Go–Go", Discover, pp. 92–93, (Jul., 1999).

Burch, "An Investigation of the $NO/H_2/O_2$ Reaction on Noble–Metal Catalysts at Low Temperatures Under Lean––Burn Conditions," Journal of Applied Catalysis B: Environmental 23, pp. 115–121 (1999).

Costa, "An Investigation of the $NO/H_2/O_2$ (Lean De–$No_x$) Reaction on a Highly Active and Selective $Pt/La_{0.7}Sr_{0.2}Ce_{0.1}FeO_3$ Catalyst at Low Temperatures", Journal of Catalysis 209, pp. 456–471 (2002).

Kirwan, "Development of a Fast Start–up O Gasoline Reformer for Near Zero Spark–Ignition Engines", Delphi Automotive Systems, pp. 1–21 (2002).

Shelef, "Twenty–five Years after Introduction of Automotive Catalysts: What Next?" Journal of Catalysis Today 62, pp. 35–50 (2000).

Koebel, "Selective Catalytic Reduction of NO and $NO_2$ at Low Temperatures", Journal of Catalysis Today 73, pp. 239–247 (2002).

Frank, "Kinetics and Mechanism of the Reduction of Nitric Oxides by $H_2$ Under Lean–Burn Conditions on a Pt–Mo–Co/ $\alpha Al_2O_3$ Catalyst", Journal of Applied Catalysis B: Environmental 19, pp. 45–57 (1998).

Nanba, "Product Analysis of Selective Catalytic Reduction of $NO_2$ with $C_2H_4$ Over H–Ferrierite", Journal of Catalysis 211, pp. 53–63 (2002).

Simanaitis, "Whither the automobile?", Road and Track, pp. 98–102 (Sep. 2001).

Stokes, "A Gasoline Engine Concept for Improved Fuel Economy—The Lean Boost System", International Falls Fuels and Lubricants Meeting and Exposition, Baltimore, MD, SAE Technical Paper Series, 14 pages (Oct. 16–19, 2000).

Chandler, "Device May Spark Clean–Running Cars", The Boston Globe, p. E1 (Jul. 12, 1999).

* cited by examiner

METHOD AND APPARATUS FOR PURGING $SO_X$ FROM A $NO_X$ TRAP

FIELD OF THE DISCLOSURE

The present disclosure relates generally to an emissions abatement system including a fuel reformer, and more particularly to an emissions abatement system for regenerating $SO_X$ absorbed by a $NO_X$ trap.

BACKGROUND OF THE DISCLOSURE

Fuel reformers reform hydrocarbon fuel into a reformate gas such as hydrogen-rich gas. In the case of an onboard fuel reformer or a fuel reformer associated with a stationary power generator, the reformate gas produced by the fuel reformer may be utilized as fuel or fuel additive in the operation of an internal combustion engine. The reformate gas may also be utilized to regenerate or otherwise condition an emission abatement device associated with an internal combustion engine or as a fuel for a fuel cell.

SUMMARY OF THE DISCLOSURE

According to an illustrative embodiment, a method of operating a fuel reformer to regenerate a $NO_X$ trap is provided. The method includes operating the fuel reformer to produce a reformate gas comprising hydrogen and carbon monoxide and advancing the reformate gas through the $NO_X$ trap to regenerate the $NO_X$ trap. The method also includes determining if a $SO_X$ regeneration of the $NO_X$ trap is to be performed and generating a $SO_X$-regeneration control signal in response thereto. Further, the method includes raising the temperature of the $NO_X$ trap in response to the $SO_X$-regeneration control signal and operating the fuel reformer so as to advance the reformate gas into the $NO_X$ trap in response to the $SO_X$-regeneration control signal.

The step of raising the temperature of the $NO_X$ trap includes raising the temperature of exhaust gases advancing through the $NO_X$ trap from an internal combustion engine. The temperature of the exhaust gases may be raised, for example, by decreasing an air-to-fuel ratio of an air/fuel mixture being introduced into the internal combustion engine. The temperature of the exhaust gases may be raised to less than about 650° C.

In one embodiment, the determining step includes determining the number of $NO_X$ purges performed and comparing the number of $NO_X$ purges performed to a predetermined set point number of $NO_X$ purges. The $SO_X$-regeneration control signal is then generated when the number of $NO_X$ purges is greater than or equal to the predetermined set point number of $NO_X$ purges.

In another embodiment, the determining step includes determining if a predetermined period of time has elapsed since the $NO_X$ trap was last desulfated and generating a time-lapsed control signal in response thereto. Operating the fuel reformer in response to the $SO_X$-regeneration signal further includes advancing the reformate gas into the $NO_X$ trap in response to generation of the time-lapsed control signal.

In still another embodiment, the determining step includes sensing the amount of $SO_X$ within the $NO_X$ trap. Further, the sensing step includes generating a trap-saturated control signal when the amount of $SO_X$ within the $NO_X$ trap reaches a predetermined accumulation level. As such, operating the fuel reformer in response to the $SO_X$-regeneration signal further includes advancing the reformate gas into the $NO_X$ trap in response to generation of the trap-saturated control signal.

According to another illustrative embodiment, there is provided a fuel reformer assembly for producing a reformate gas. The fuel reformer assembly includes a fuel reformer and a reformer controller electrically coupled to the fuel reformer. The reformer controller includes a processing unit and a memory unit electrically coupled to the processing unit. The memory unit has stored therein a plurality of instructions which, when executed by the processing unit, causes the processing unit to (i) operate the fuel reformer so as to produce a reformate gas comprising hydrogen and carbon monoxide, (ii) operate the fuel reformer so as to advance the reformate gas through a $NO_X$ trap so as to regenerate the $NO_X$ trap, (iii) determine if a $SO_X$ regeneration of the $NO_X$ trap is to be performed and generate a $SO_X$-regeneration control signal in response thereto, (iv) raise the temperature of the $NO_X$ trap in response to the $SO_X$-regeneration control signal, and (v) operate the fuel reformer so as to advance the reformate gas into the $NO_X$ trap in response to the $SO_X$-regeneration control signal. The raising the temperature step comprises generating a temperature control signal which is communicated to an engine control unit so as to cause the engine control unit to decrease an air-to-fuel ratio of an air/fuel mixture being introduced into an internal combustion engine. The decreased air-to-fuel ratio of the air/fuel mixture raises the temperature of exhaust gases exiting the internal combustion engine for advancement through the $NO_X$ trap.

According to still another illustrative embodiment, there is provided a method of desulfating a $NO_X$ trap including operating a fuel reformer so as to produce a reformate gas comprising hydrogen and carbon monoxide, and advancing the reformate gas into the $NO_X$ trap to react the hydrogen and carbon monoxide with $SO_X$ trapped on the $NO_X$ trap to remove $SO_X$ from the $NO_X$ trap.

The above and other features of the present disclosure will become apparent from the following description and the attached drawings.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Figure 1:
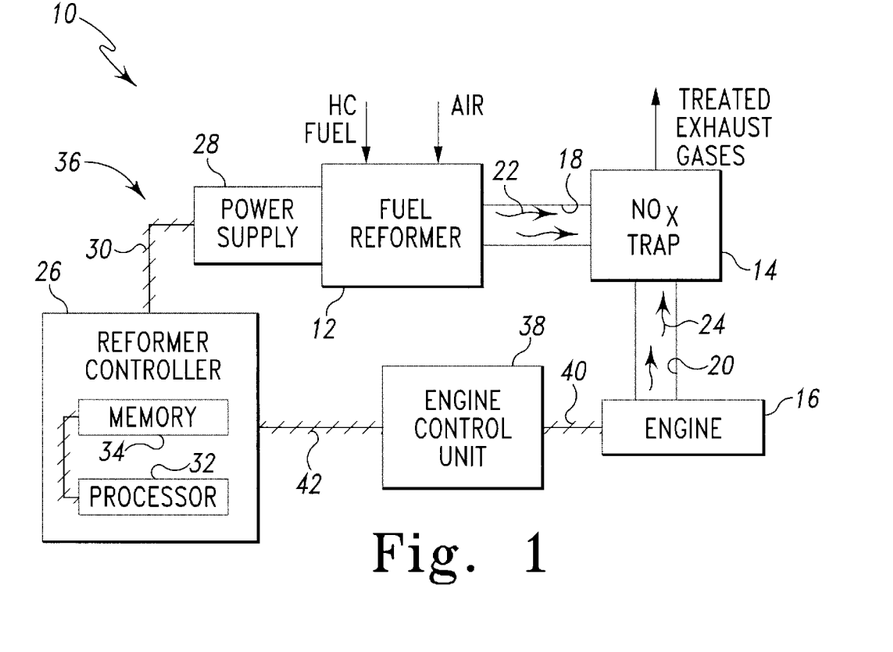
FIG. 1 is a simplified block diagram of an emissions abatement system including, a fuel reformer, a $NO_X$ trap, a passageway to conduct a reformats gas produced by the fuel reformer to the $NO_X$ trap, and wherein the fuel reformer is under the control of a reformer controller and an engine of the power system is under the control of an engine control unit which is discrete from the reformer controller.

Referring now to FIG. 1, there is shown an emissions abatement system 10 including a fuel reformer 12, a $NO_X$ trap 14, and an internal combustion engine 16. System 10 is provided to desulfate $NO_X$ trap 14 (e.g., remove or purge $SO_X$ trapped or absorbed therein). System 10 may also regenerate $NO_X$ trap 14 to remove $NO_X$ trapped therein as well. Engine 16 produces untreated emissions 24 which include, among other things, $NO_X$ and $SO_X$. $NO_X$ trap 14 traps the $NO_X$ present in exhaust gases 24 to prevent $NO_X$ from being exhausted into the atmosphere, for example. Periodically, or as desired, $NO_X$ trap 14 may be regenerated to remove $NO_X$ trapped therein. $SO_X$, however, also has a tendency to become trapped within $NO_X$ trap 14 and may eventually saturate $NO_X$ trap 14 thus preventing additional $NO_X$ from being retained or trapped within $NO_X$ trap 14. Further, $SO_X$ is generally not regenerated when a $NO_X$ regeneration of $NO_X$ trap 14 is performed. Therefore, $SO_X$ may continue to accumulate within $NO_X$ trap 14 and effectively poison $NO_X$ trap 14 by rendering $NO_X$ trap 14 ineffective at trapping $NO_X$. As mentioned above, system 10 is provided to purge $SO_X$ trapped within $NO_X$ trap 14 so that $NO_X$ trap 14 may continue to trap $NO_X$ therein.

Referring back to FIG. 1, a passageway 18 connects fuel reformer 12 with $NO_X$ trap 14, and another passageway 20 connects engine 16 with $NO_X$ trap 14. Fuel reformer 12 reforms (i.e., converts) hydrocarbon fuel into a reformate gas 22 that includes, among other things, hydrogen and carbon monoxide. Passageway 18 conducts the reformate gas 22 to $NO_X$ trap 14 so that reformate gas 22 may be used to purge $SO_X$ from $NO_X$ trap 14 to prevent $SO_X$ poisoning of $NO_X$ trap 14 and thereby increase the efficiency of $NO_X$ trap 14 in reducing $NO_X$ emissions.

Fuel reformer 11 may be embodied as any type of fuel reformer, such as, for example, a catalytic fuel reformer, a thermal fuel reformer, a steam fuel reformer, or any other type of partial oxidation fuel reformer. Fuel reformer 12 may also be embodied as a plasma fuel reformer. A plasma fuel reformer uses plasma to convert a mixture of air and hydrocarbon fuel into a reformate gas rich in hydrogen and carbon monoxide. Systems including plasma fuel reformers are disclosed in U.S. Pat. No. 5,425,332 issued to Rabinovich et al.; U.S. Pat. No. 5,437,250 issued to Rabinovich et al.; U.S. Pat. No. 5,409,784 issued to Bromberg et al.; and U.S. Pat. No. 5,887,554 issued to Cohn, et al., the disclosures of which are hereby incorporated by reference.

As shown in FIG. 1, fuel reformer 12 and its associated components are under the control of a reformer controller 26. In particular, components such as temperature, pressure, or gas composition sensors (not shown), a fuel inlet assembly such as a fuel injector (not shown), and air inlet valve(s) (not shown) are each electrically coupled to the reformer controller 26. Moreover, a power supply 28 is electrically coupled to the reformer controller 26 via a signal line 30. Although signal line 30 is shown schematically as a single line, it should be appreciated that signal line 30, along with the signal line(s) associated with each of the other components of fuel reformer 12, may be configured as any type of signal carrying assembly which allows for the transmission of electrical signals in either one or both direction between the reformer controller 26 and the corresponding component. For example, any one or more of the signal lines may be embodied as a wiring harness having a number of signal lines which transmit electrical signals between the reformer controller 26 and the corresponding component. It should be appreciated that any number of other wiring configurations may also be used. For example, individual signal wires may be used, or a system utilizing a signal multiplexer may be used for the design of any one or more of the signal lines. Moreover, the signal lines may be integrated such that a single harness or system is utilized to electrically couple some or all of the components associated with fuel reformer 12 to reformer controller 26.

The reformer controller 26 is, in essence, the master computer responsible for interpreting electrical signals sent by sensors associated with the fuel reformer 12 and for activating electronically-controlled components associated with the fuel reformer 12 in order to control the fuel reformer 12. For example, the reformer controller 26 of the present disclosure is operable to, amongst many other things, actuate or shutdown the fuel reformer 12, determine the beginning and end of each injection cycle of fuel into the fuel reformer 12, calculate and control the amount and ratio of air and fuel to be introduced into the fuel reformer 12, determine the temperature of the fuel reformer 12, and determine the power level to supply to the fuel reformer 12.

To do so, the reformer controller 26 includes a number of electronic components commonly associated with electronic units which are utilized in the control of electromechanical systems. For example, the reformer controller 26 may include, amongst other components customarily included in such devices, a processor such as a microprocessor 32 and a memory device 34 such as a programmable read-only memory device ("PROM") including erasable PROM's (EPROM's or EEPROM's). The memory device 34 is provided to store, amongst other things, instructions in the form of, for example, a software routine (or routines) which, when executed by the microprocessor 32, allows the reformer controller 26 to control operation of the fuel reformer 12.

The reformer controller 26 also includes an analog interface circuit (not shown). The analog interface circuit converts the output signals from the various fuel reformer sensors into a signal which is suitable for presentation to an input of the microprocessor 32. In particular, the analog interface circuit, by use of an analog-to-digital (A/D) converter (not shown) or the like, converts the analog signals generated by the sensors into a digital signal for use by the microprocessor 32. It should be appreciated that the A/D converter may be embodied as a discrete device or number of devices, or may be integrated into the microprocessor. It should also be appreciated that if any one or more of the sensors associated with the fuel reformer 12 generate a digital output signal, the analog interface circuit may be bypassed.

Similarly, the analog interface circuit converts signals from the microprocessor 32 into an output signal which is suitable for presentation to the electrically-controlled components associated with the fuel reformer 12 (e.g., the power supply 28). In particular, the analog interface circuit, by use of a digital-to-analog (D/A) converter (not shown) or the like, converts the digital signals generated by the microprocessor 32 into analog signals for use by the electronically-controlled components associated with the fuel reformer 12 such as the power supply 28. It should be appreciated that, similar to the A/D converter described above, the D/A converter may be embodied as a discrete device or number of devices, or may be integrated into the microprocessor 32. It should also be appreciated that if any one or more of the electronically-controlled components associated with the fuel reformer 12 operate on a digital input signal, the analog interface circuit may be bypassed.

Hence, the reformer controller 26 may be operated to control operation of the fuel reformer 12. In particular, the reformer controller 26 executes a routine including, amongst other things, a closed-loop control scheme in which the reformer controller 26 monitors outputs of the sensors associated with the fuel reformer 12 in order to control the inputs to the electronically-controlled components associated therewith. To do so, the reformer controller 26 communicates with the sensors associated with the fuel reformer in order to determine, amongst numerous other things, the amount, temperature, and/or pressure of air and/or fuel being supplied to the fuel reformer 12, the amount of oxygen in the reformate gas, the temperature of the reformate gas being produced thereby, and the composition of the reformate gas. Armed with this data, the reformer controller 26 performs numerous calculations each second, including looking up values in preprogrammed tables, in order to execute algorithms to perform such functions as determining when or how long the fuel reformer's fuel injector or other fuel input device is opened, controlling the power level input to the fuel reformer, controlling the amount of air advanced through the air inlet valve(s), etcetera.

As mentioned above, reformer controller 26 is electrically coupled to power supply 28 associated with the fuel reformer 12. As such, the reformer controller 26 communicates with the power supply 28 to selectively operate and shutdown the fuel reformer 12. Collectively, the fuel reformer 12 and the reformer controller 26 define a fuel reformer system 36 which, among other uses, may be used in the construction of an onboard system for a vehicle or a stationary power generator.

The engine 16, on the other hand, is under the control of an engine control unit 38. In particular, the engine control unit 38 is electrically coupled to a number of electronically-controlled components associated with the engine 16 (e.g., a fuel injector assembly, ignition assembly, etcetera) via a signal line 40. As with the signal lines associated with the fuel reformer 12, the signal line 40 may be any type of signal carrying connector including a wiring harness for carrying the electrical signals associated with numerous engine components.

The reformer controller 26 and the engine control unit 38 are in communication with one another. In particular, the reformer controller 26 is electrically coupled to the engine control unit 38 via a signal line 42.

Figure 2:
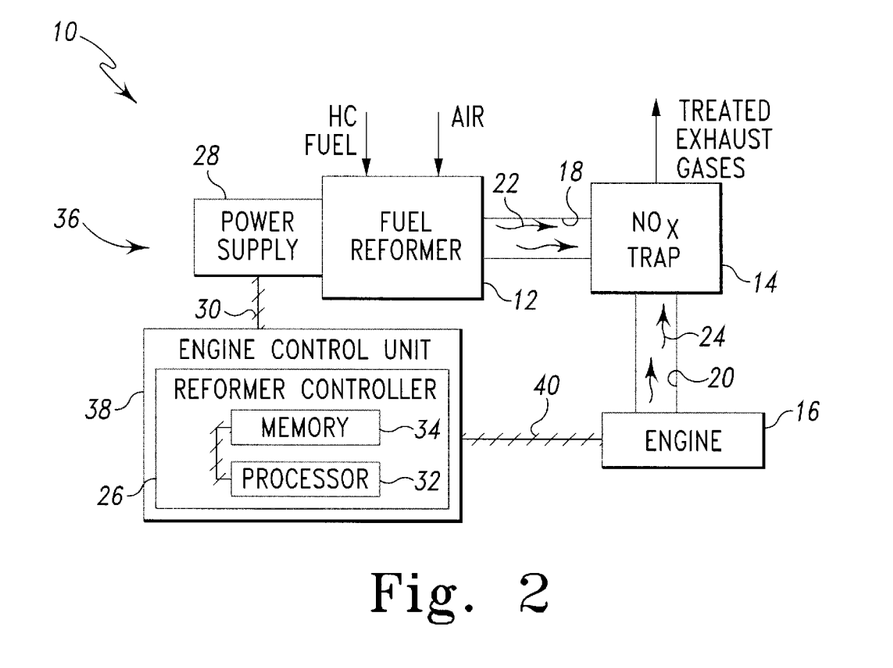
FIG. 2 is a simplified block diagram similar to FIG. 1 except that the reformer controller is integrated into the engine control unit.

The reformer controller 26 and the engine control unit 38 are shown as discrete components in FIG. 1. It should be appreciated, however, that the reformer controller 26 may be integrated into an engine control unit 38, as shown in FIG. 2. In such a way, a single hardware component may be utilized to control both the fuel reformer 12 and the engine 16.

Hence, the aforedescribed control scheme may be utilized to control operation of the fuel reformer 12 and the engine 16. In an exemplary embodiment, the aforedescribed control scheme includes a routine for desulfating $NO_X$ trap 14, or in other words, regenerating $NO_X$ trap 14 to remove $SO_X$ trapped therein. As mentioned above, $NO_X$ trap 14 is provided to trap $NO_X$ contained within untreated exhaust gases 24 emitted from engine 16 so that generally $NO_X$-free treated emissions are exhausted out of $NO_X$ trap 14. As desired, $NO_X$ trap 14 also may be regenerated to remove $NO_X$ trapped therein.

Also as described above, untreated exhaust gas 24 includes $SO_X$. Due to the nature of various $NO_X$ traps, $SO_X$ may be trapped therein as well, thus poisoning the $NO_X$ trap 14 or otherwise reducing the trap's ability to trap additional amounts of $NO_X$. The present disclosure, therefore, provides a method and system 10 for desulfating $NO_X$ trap 14, or, in other words, regenerating $NO_X$ trap 14 to remove or purge $SO_X$ which has been absorbed or trapped therein.

In particular, system 10 of the illustrative embodiments removes $SO_X$ from $NO_X$ trap 14 by both raising the temperature of $NO_X$ trap 14 and introducing reformate gas 22 into $NO_X$ trap 14 via passageway 18. As mentioned above, reformate gas 22 includes both hydrogen gas and carbon monoxide. Generally, absorbed $SO_X$ may be purged from $NO_X$ trap 14 by raising the $NO_X$ trap 14 temperature in excess of about 650° C. while also post injecting additional hydrocarbon fuel to react with the absorbed $SO_X$. Reformate gas 22, as opposed to hydrocarbon fuel, reacts with the absorbed $SO_X$ at a temperature lower than 650° C. to regenerate $NO_X$ trap 14 and remove $SO_X$ absorbed by $NO_X$ trap 14 to allow $NO_X$ trap 14 to more efficiently and effectively trap $NO_X$ therein.

The temperature of $NO_X$ trap 14 is raised by raising the temperature of untreated exhaust gases 24 advancing through $NO_X$ trap 14 from engine 16. Particularly, one way to raise the temperature of exhaust gases 24 exiting engine 16 is to reduce an air-to-fuel ratio of an air/fuel mixture being introduced into engine 16. The air-to-fuel ratio of the air/fuel mixture is controlled by engine control unit 38. It is within the scope of this disclosure for the steps of raising the temperature of $NO_X$ trap 14 and advancing reformate gas 22 into $NO_X$ trap 14 to be performed contemporaneously or, in the alternative, for one step to be performed before the other and visa versa. Further, although the present system 10 desulfates $NO_X$ trap 14 by both raising the temperature of $NO_X$ trap 14 and advancing reformate fuel 22 into $NO_X$ trap 14, it is within the scope of this disclosure to remove $SO_X$ from $NO_X$ trap 14 without the need to raise the temperature of $NO_X$ trap 14 by advancing reformate fuel 22 into $NO_X$ trap 14 without the need to raise the temperature of $NO_X$ trap 14 at all.

Hence, the control scheme of the present disclosure includes a routine for selectively raising the temperature of the $NO_X$ trap 14 to allow reformate gas containing hydrogen and carbon monoxide to be introduced into $NO_X$ trap 14 to react with accumulated $SO_X$ therein thereby removing the $SO_X$ and regenerating the $NO_X$ trap 14. The duration of the $SO_X$ purge may be configured to ensure that all (or substantially all) of the accumulated $SO_X$ has been purged from $NO_X$ trap 14. In general, a $SO_X$ regeneration of $NO_X$ trap 14 is performed as a response to generation of a $SO_X$ purge request. A $SO_X$ purge request may be generated in response to any number of events.

Figure 3:
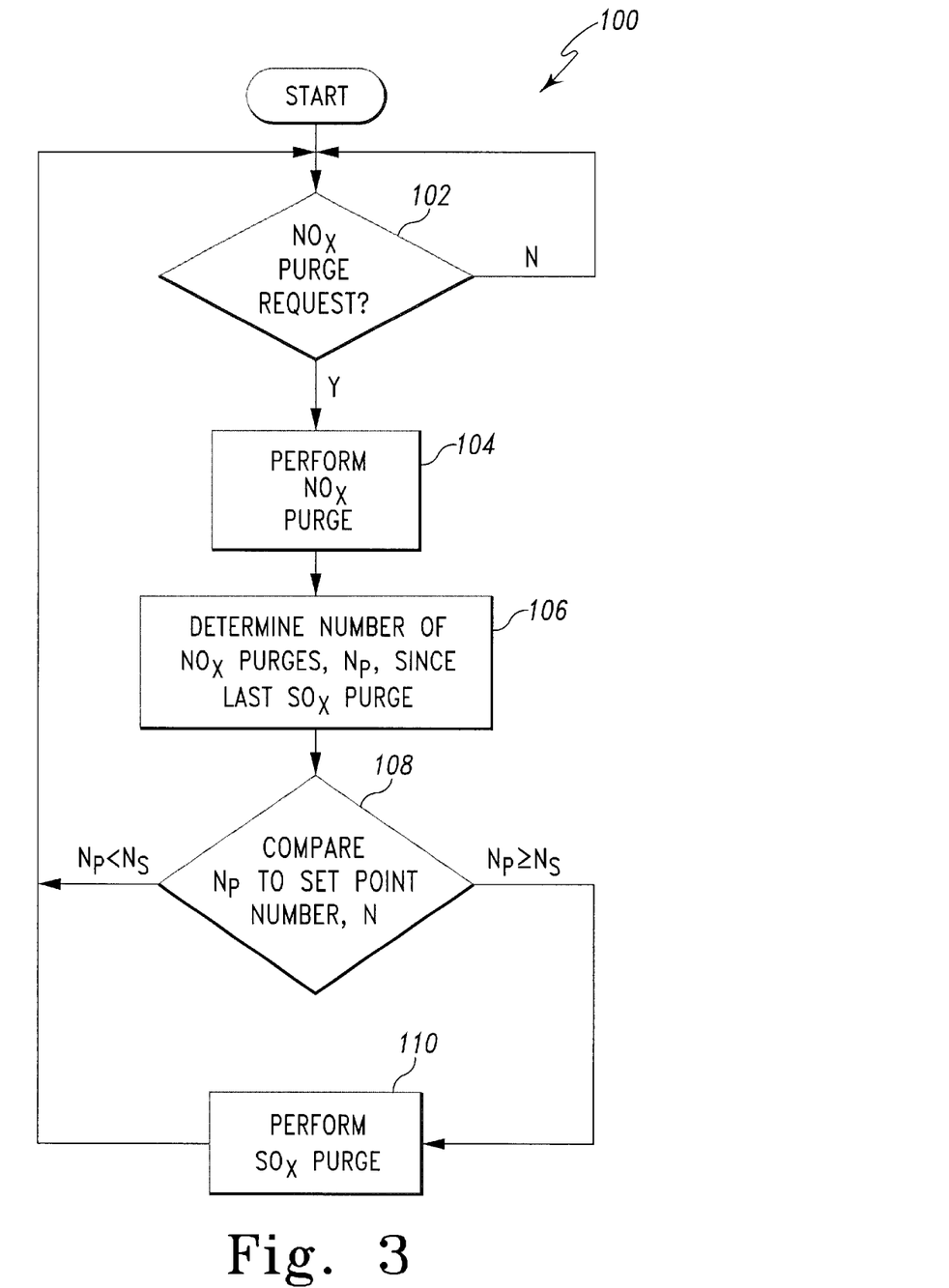
FIG. 3 is a flowchart of a control routine for desulfating the $NO_X$trap of FIGS. 1 and 2 after regenerating the $NO_X$ trap (to remove $NO_X$ trapped therein) a predetermined number of times.

One exemplary way to determine whether a $SO_X$ purge (or desulfation) of $NO_X$ trap 14 is to be performed is to purge the accumulated $SO_X$ from $NO_X$ trap 14 after regenerating the $NO_X$ from within $NO_X$ trap 14 a predetermined number of times. Such a control routine 100 is shown in FIG. 3 and begins with step 102 where reformer controller 26 determines whether a $NO_X$ purge of $NO_X$ trap 14 has been requested. Illustratively, a $NO_X$ purge may be requested as a result of any number of factors including, time lapse since last $NO_X$ purge, $NO_X$ saturation of $NO_X$ trap 14, etcetera.

If a $NO_X$ purge has not been requested, control routine 100 loops back to the beginning and continues to determine whether a $NO_X$ purge has been requested. However, if a $NO_X$ purge request has been sensed by the reformer controller 26, control routine 100 advances to step 104 and a $NO_X$ purge of $NO_X$ trap 14 is performed. Illustratively, $NO_X$ trap 14 may be purged raising the temperature of $NO_X$ trap 14 to a predetermined temperature and advancing reformed fuel through $NO_X$ trap 14, similar to $SO_X$ regeneration of $NO_X$ trap 14. However, the temperature required for $NO_X$ regeneration of $NO_X$ trap 14 is generally less than the temperature required for $SO_X$ regeneration of $NO_X$ trap 14. In other words, a $NO_X$ purge may be performed at a lower temperature than a SOX purge. It is within the scope of this disclosure for a $NO_X$ purge to be accomplished by other means as well.

Once a $NO_X$ purge has been performed, control routine 100 advances to step 106 to determine the number of $NO_X$ purges performed ($N_P$) since the previous $SO_X$ purge of $NO_X$ trap 14. Once the number of $NO_X$ purges performed ($N_P$) has been determined, control routine 100 advances to step 108. As shown in step 108, reformer controller 26 compares the number of $NO_X$ purges performed ($N_P$) since the previous $SO_X$ purge of $NO_X$ trap 14 to a set point number (N). If the number of $NO_X$ purges performed ($N_P$) is less than set point number (N), the control routine 100 loops back to step 102 to determine whether a $NO_X$ purge has been requested. However, if the number of $NO_X$ purges performed ($N_P$) is greater than or equal to the set point number of $NO_X$ purges (N), a control signal is generated, and the control routine 100 advances to step 110.

In step 110, $SO_X$ is purged from $NO_X$ trap 14 in the manner described above. In particular, reformer controller 26 may generate a control signal on signal line 30 thereby instructing the fuel reformer 12 to advance reformate gas to $NO_X$ trap 14 while also generating a control signal on signal line 42 instructing engine control unit 38 to operate the engine to cause a higher temperature exhaust gas 24 to be advanced from engine 16 to $NO_X$ trap 14. As such, engine control unit 38 may generate a control signal on line 40 instructing engine 16 to decrease the air-to-fuel ratio of the air/fuel mixture introduced into engine 16 to raise the temperature of the untreated exhaust gas 24.

Figure 4:
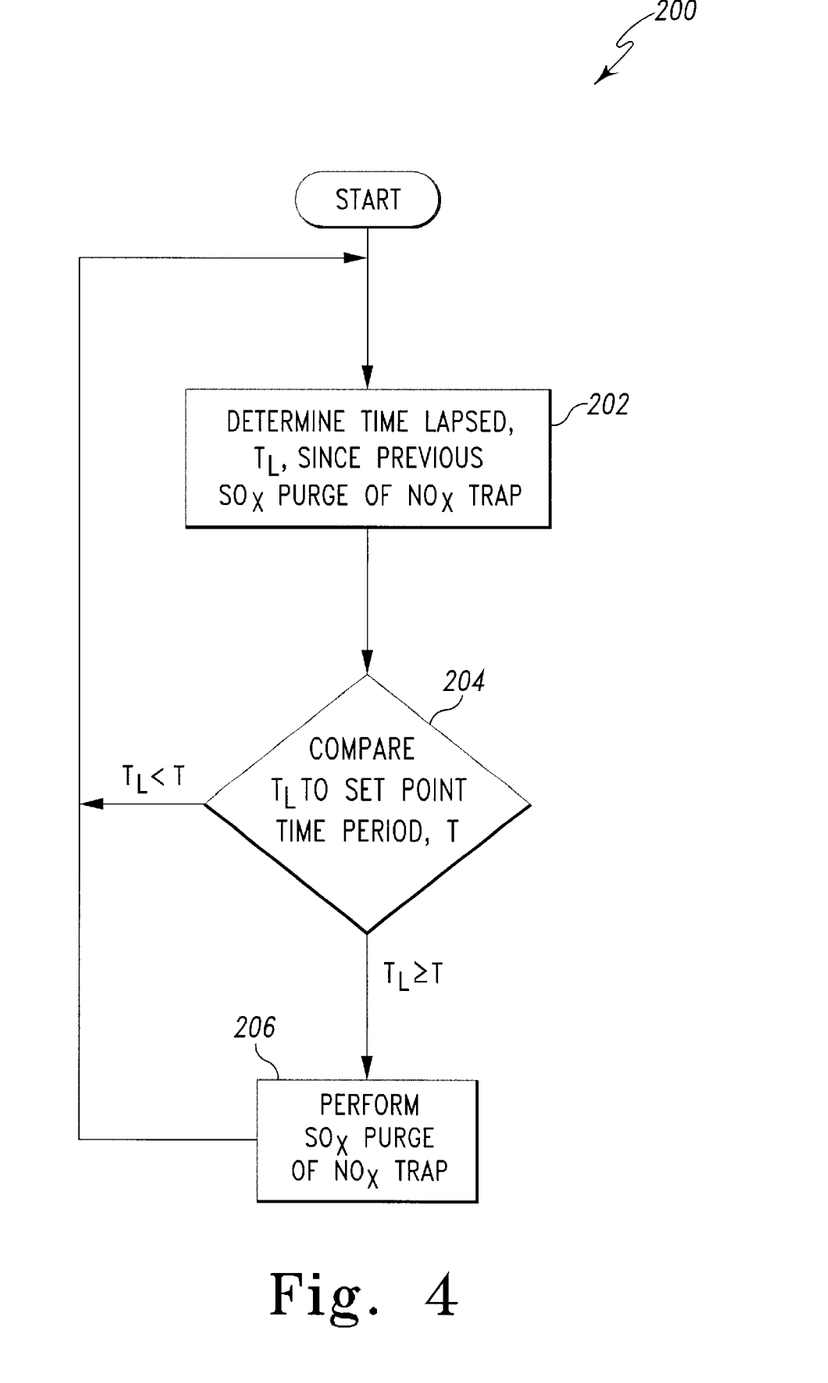
FIG. 4 is a flowchart of another control routine for desulfating the $NO_X$ trap of FIGS. 1 and 2 after a predetermined amount of time has passed since previously desulfating the $NO_X$ trap.

In another control routine 200, shown in FIG. 4, $SO_X$ which accumulates within $NO_X$ trap 14 is regularly purged at predetermined time intervals. In general, control routine 200 begins with step 202 in which the reformer controller 26 determines the time which has lapsed ($T_L$) since $SO_X$ was last purged from $NO_X$ trap 14, or more particularly, since fuel reformer 12 was last instructed to introduce reformate gas 22 into $NO_X$ trap 14 to desulfate $NO_X$ trap 14. Once controller 26 has determined the time which has lapsed ($T_L$), the control routine 200 advances to step 204. In step 204, controller 26 compares the time which has lapsed ($T_L$) to a predetermined set point time period (T). In particular, as described herein, a predetermined time period (T) between $SO_X$ purge cycles may be established as desired.

If the amount of time lapsed ($T_L$) is less than the set point time period (T), the control routine 200 loops back to step 202 to continue monitoring the time which has lapsed since the last $SO_X$ regeneration. It is within the scope of this disclosure for controller 26 to measure a predetermined amount of lapsed time from any step or reference point within control routine 200 or general operation of system 10. If, however, the amount of time lapsed ($T_L$) is greater than or equal to the set point time period (T), the control routine advances to step 206 to desulfate or purge $NO_X$ trap 14. $NO_X$ trap 14 is desulfated in the manner discussed above with respect to control routine 100.

Figure 5:
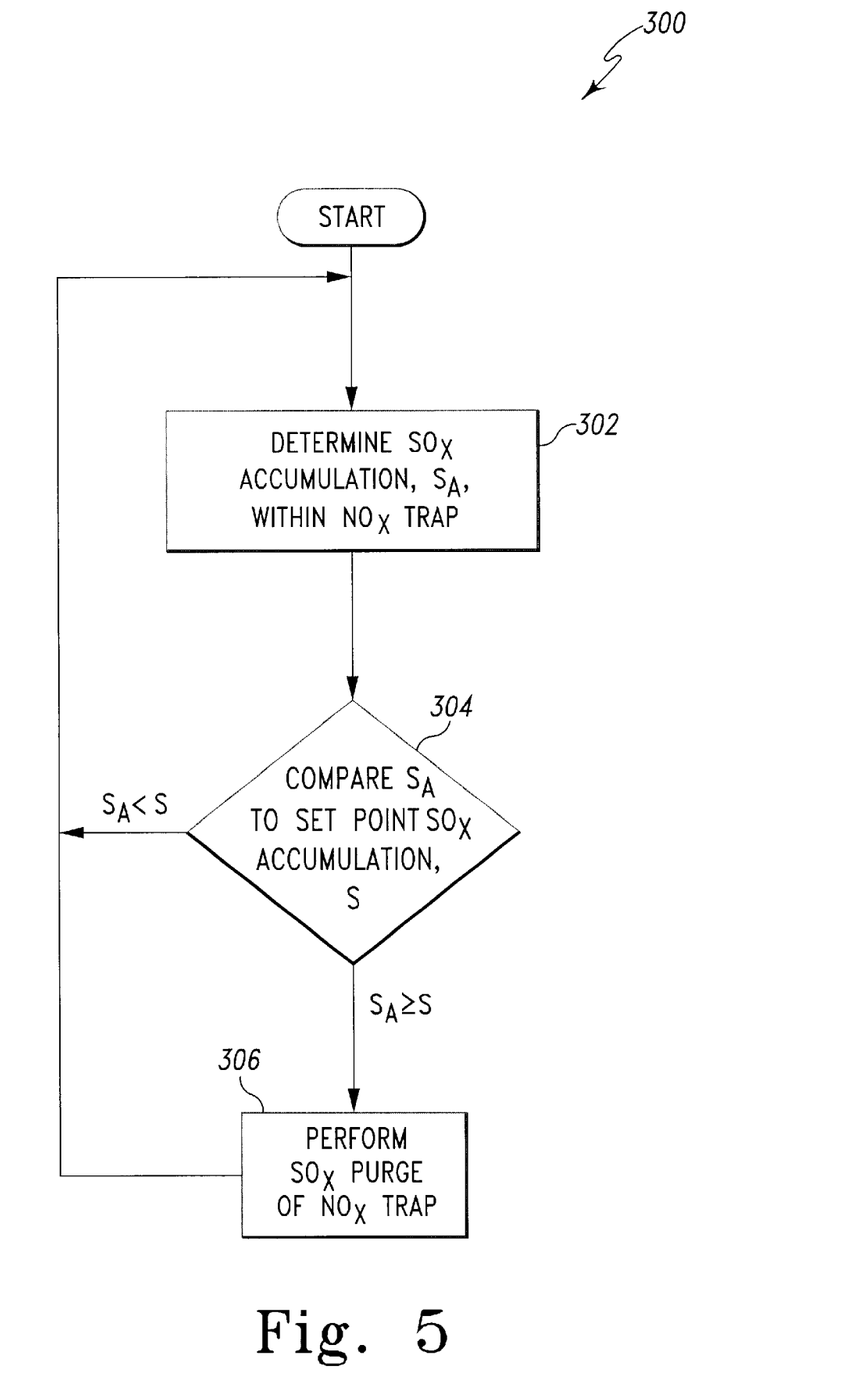
FIG. 5 is a flowchart of yet another control routine for desulfating the $NO_X$ trap of FIGS. 1 and 2 after the accumulation of $SO_X$ within the $NO_X$ trap has reached a predetermined amount.

In yet another illustrative control routine 300, shown in FIG. 5, $NO_X$ trap 14 is desulfated based upon the accumulation of $SO_X$ within $NO_X$ trap 14. Control routine begins with step 302 in which reformer controller 26 determines the amount of $SO_X$ ($S_A$) which has accumulated within $NO_X$ trap 14. This may be accomplished through the use of a sensor or group of sensors associated with $NO_X$ trap 14 and provided to indirectly measure or detect the amount of $SO_X$ accumulated within $NO_X$ trap 14. Such a sensor or sensors may be electrically coupled to reformer controller 26 via a signal line (not shown) so that controller 26 may scan or otherwise read the signal line in order to monitor output from the sensor(s). The output signals produced by the sensor(s) would be indicative of the amount of $SO_X$ ($S_A$) within $NO_X$ trap 14. Once the controller 26 has determined the amount of accumulated $SO_X$ ($S_A$) within $NO_X$ trap 14, the control routine 300 advances to step 304.

In step 304, controller 26 compares the sensed amount of $SO_X$ ($S_A$) within $NO_X$ trap 14 to a set point $SO_X$ accumulation value (S). In particular, as described herein, a predetermined $SO_X$ accumulation value (S), or set point, may be established which corresponds to a particular amount of $SO_X$ accumulation within $NO_X$ trap 14. If the amount of $SO_X$ accumulation ($S_A$) within $NO_X$ trap 14 is less than the set point $SO_X$ accumulation value (S), the control routine 300 loops back to step 102 to continue monitoring the output from the sensor(s). However, if the $SO_X$ accumulation ($S_A$) within $NO_X$ trap 14 is equal to or greater than the set point $SO_X$ accumulation value (S), a control signal is generated, and the control routine 300 advances to step 306. In step 306, reformer controller 26 operates in the manner described above to desulfate $NO_X$ trap 14.

As described above, controller 26 operates to desulfate $NO_X$ trap 14 by instructing fuel reformer 12 to advance reformate gas 22 into $NO_X$ trap 14 and by instructing engine 16 to decrease the air-to-fuel ratio of the air/fuel mixture introduced into engine 16 to increase the temperature of untreated exhaust gas 24 for advancement into $NO_X$ trap 14. Controller 26 operates in such a manner in response to various signals and/or events, such as after a predetermined number of $NO_X$ purges, at predetermined time intervals, or in response to output from one or more sensors, for example. However, it is within the scope of this disclosure for controller 26 (with engine control unit 38) to desulfate $NO_X$ trap 14 in response to various other signals and/or conditions.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

What is claimed is:

1. A method of operating a fuel reformer to regenerate a $NO_X$ trap, the method comprising the steps of:

(a) operating the fuel reformer so as to produce a reformate gas comprising hydrogen and carbon monoxide, (b) advancing the reformate gas through the $NO_X$ trap so as to regenerate the $NO_X$ trap, (c) determining if a $SO_X$ regeneration of the $NO_X$ trap is to be performed and generating a $SO_X$-regeneration control signal in response thereto, (d) raising the temperature of the $NO_X$ trap in response to the $SO_X$-regeneration control signal, and (e) operating the fuel reformer so as to advance the reformate gas into the $NO_X$ trap in response to the $SO_X$-regeneration control signal.

2. The method of claim 1, wherein steps (d) and (e) are performed contemporaneously.

3. The method of claim 1, wherein step (d) is performed before step (e).

4. The method of claim 1, wherein:

the determining step includes determining the number of $NO_X$ purges performed and comparing the number of $NO_X$ purges performed to a predetermined setpoint number of $NO_X$ purges, and the $SO_X$-regeneration control signal is generated when the number of $NO_X$ purges is greater than or equal to the predetermined setpoint number of $NO_X$ purges.

5. The method of claim 1, wherein the step of raising the temperature of the $NO_X$ trap includes raising the temperature of exhaust gases advancing through the $NO_X$ trap from an internal combustion engine.

6. The method of claim 5, wherein the step of raising the temperature of exhaust gases includes decreasing an air-to-fuel ratio of an air/fuel mixture being introduced into the internal combustion engine.

7. A fuel reformer assembly for producing reformate gas, the fuel reformer assembly comprising:

a fuel reformer, and a reformer controller electrically coupled to the fuel reformer, the controller comprising (i) a processing unit, and (ii) a memory unit electrically coupled to the processing unit, the memory unit having stored therein a plurality of instructions which, when executed by the processing unit, causes the processing unit to:

(a) operate the fuel reformer so as to produce a reformate gas comprising hydrogen and carbon monoxide, (b) operate the fuel reformer so as to advance the reformate gas through a $NO_X$ trap so as to regenerate the $NO_X$ trap, (c) determine if a $SO_X$ regeneration of the $NO_X$ trap is to be performed and generate a $SO_X$-regeneration control signal in response thereto, (d) raise the temperature of the $NO_X$ trap in response to die $SO_X$-regeneration control signal, and (e) operate the fuel reformer so as to advance the reformate gas into the $NO_X$ trap in response to the $SO_X$-regeneration control signal.

8. The fuel reformer assembly of claim 7, wherein the raising the temperature step comprises generating a temperature control signal which is communicated to an engine control unit so as to cause the engine control unit to decrease an air-to-fuel ratio of an air/fuel mixture being introduced into an internal combustion engine to raise the temperature of exhaust gases exiting the internal combustion engine to be advanced through the $NO_X$ trap.

9. The fuel reformer assembly of claim 7, further including a sensor to sense the amount of $SO_X$ within the $NO_X$ trap, and wherein the plurality of instructions, when executed by the processing unit, further causes the processing unit to:

(i) generate a $SO_X$ control signal when the amount of $SO_X$ within the $NO_X$ trap reaches a predetermined level, and (ii) raise the temperature of the $NO_X$ trap in response to generation of the $SO_X$ control signal.

10. The fuel reformer assembly of claim 7, wherein the plurality of instructions, when executed by the processing unit, further causes the processing unit to:

(i) determine when a predetermined period of time has elapsed since a previous $SO_X$ purge had been performed and generate a time-lapsed control signal in response thereto, and (ii) raise the temperature of the $NO_X$ trap in response to generation of the $SO_X$ control signal.

11. The fuel reformer assembly of claim 7, wherein the plurality of instructions, when executed by the processing unit, further causes the processing unit to:

(i) determine the number of $NO_X$ purges performed and compare the number of $NO_X$ purges performed to a predetermined setpoint number of $NO_X$ purges, and (ii) generate the $SO_X$ control signal when the number of NOX purges is greater than or equal to the predetermined setpoint number of NOX purges.

* * * * *